United States Patent [19]
Scheckenbach et al.

[11] Patent Number: 5,780,561
[45] Date of Patent: *Jul. 14, 1998

[54] MIXTURES OF POLYARYLENE SULFONES WITH POLYARYLENE SULFOXIDES AND POLYARYLENE SULFIDES

[75] Inventors: Helmut Scheckenbach, Langen; Andreas Schleicher, Einhausen; Jürgen Kulpe, Frankfurt, all of Germany

[73] Assignee: Hoechst Aktiengesellschaft, Germany

[*] Notice: This patent issued on a continued prosecution application filed under 37 CFR 1.53(d), and is subject to the twenty year patent term provisions of 35 U.S.C. 154(a)(2).

[21] Appl. No.: 718,669

[22] Filed: Sep. 24, 1996

Related U.S. Application Data

[63] Continuation of Ser. No. 390,060, Feb. 17, 1995, abandoned.

[30] Foreign Application Priority Data

Feb. 22, 1994 [DE] Germany .................. 44 05 536.6

[51] Int. Cl.⁶ .................................................. C08F 283/00
[52] U.S. Cl. ..................... 525/534; 525/535; 525/537; 264/331.11; 501/94
[58] Field of Search ........................ 525/534, 535, 525/537; 264/331.11; 501/94

[56] References Cited

U.S. PATENT DOCUMENTS

| | | | |
|---|---|---|---|
| 4,021,596 | 5/1977 | Bailey | 525/537 |
| 4,486,578 | 12/1984 | Asakura et al. | 525/535 |
| 4,935,473 | 6/1990 | Fukuda et al. | 525/537 |
| 4,960,841 | 10/1990 | Kawabata et al. | 525/537 |
| 5,276,111 | 1/1994 | Bagrodia et al. | 525/537 |

FOREIGN PATENT DOCUMENTS

| | | | |
|---|---|---|---|
| 0 266 791 | 5/1988 | European Pat. Off. | |
| 0 268 765 | 6/1988 | European Pat. Off. | |
| 0 388 969 | 9/1990 | European Pat. Off. | |
| 58-098362 | 6/1983 | Japan | 525/537 |
| 63-150325 | 6/1988 | Japan | 525/537 |
| 2-214774 | 8/1990 | Japan | 525/537 |

OTHER PUBLICATIONS

Patent Abstraacts of Japan, vol. 004, No. 129, Sep. 10, 1980.
Polymer Bulletin, Bd. 26, Nr. 3, Aug. 1, 1991, pp. 349–356.

*Primary Examiner*—Melvyn I. Marquis
*Attorney, Agent, or Firm*—Connolly & Hutz

[57] ABSTRACT

Binary and tertiary mixtures comprise (A) from 33 to 99% by weight of at least one polyarylene sulfone, (B) from 1 to 67% by weight of at least one polyarylene sulfoxide and/or (C) from 1 to 67% by weight of a polyarylene sulfide, where the sum of the components (A), (B) and (C) is always 100%.

These mixtures can be processed to give homogeneous shaped parts, which are converted by the processing procedure into homogeneous polymer masses and only have the glass transition temperature of the polyarylene sulfone.

13 Claims, No Drawings

MIXTURES OF POLYARYLENE SULFONES WITH POLYARYLENE SULFOXIDES AND POLYARYLENE SULFIDES

This application is a continuation application of Ser. No. 390,060, filed Feb. 17, 1995 and now abandoned.

1. Field of the Invention

The invention relates to binary and tertiary mixtures of polyarylene sulfones with polyarylene sulfoxides and polyarylene sulfides and shaped bodies produced therefrom.

2. Description of the Prior Art

Polyarylene sulfones have been known for some time. Their preparation is described in numerous patents (GB-A 1 365 486, DE-A 1 938 806, JP-Sho 63-210130, and the as yet unpublished German Patent Application P 43 14 738.0 "Process for the oxidation of polyarylene compounds containing thioether groups" dated May 4, 1993) and publications (Gabler et al. Chimia, 28, (1974), 567).

Mixtures of fluoropolymers and oxidized polyarylene sulfides are likewise known. The oxidized polyarylene sulfides here lead to improved abrasion behavior and a reduced creep tendency of the fluoropolymers (as yet unpublished German Patent Application of Jul. 10, 1993 P 43 23 181.0 "Mixtures of fluoropolymers and oxidized polyarylene sulfides" and P 43 23 121.7 "Abrasion-resistant fluoropolymer mixtures").

Polyarylene sulfones are exceptionally temperature-resistant polymers. Owing to the chemical structure, they generally possess an inherent flame resistance.

However, owing to their high melting point (e.g. polyphenylene sulfone: mp=520° C.), partially crystalline polyarylene sulfones cannot be processed thermoplastically if the polymers are not thermally stable at processing temperatures above their melting point. Such polyarylene sulfones can also be processed only with great difficulty by hot pressing or using the transfer molding process.

Although, in these processes, temperatures above the glass transition temperature (e.g. polyphenylene sulfone: $T_g=350°$ C.) lead to melting of the amorphous components, the latter are not homogeneously plasticized, particularly in the case of relatively large or complicated shaped bodies, which causes, inter alia, crack formation within the shaped body.

It is therefore an object of the invention to reduce or avoid the disadvantages mentioned.

SUMMARY OF THE INVENTION

The invention accordingly provides polymer mixtures of (A) at least one polyarylene sulfone in a proportion from 33 to 99% by weight, (B) at least one polyarylene sulfoxide in a proportion of from 1 to 67% by weight, preferably from 5 to 50% by weight, in particular from 15 to 40% by weight and/or (C) at least one polyarylene sulfide in a proportion of from 1 to 67% by weight, preferably from 1 to 40% by weight, in particular from 1 to 25% by weight, where the sum of the components (A), (B) and/or (C) is always 100% by weight.

It has been found that the polyarylene sulfones can be processed to give homogeneous shaped parts by addition of polyarylene sulfoxides and/or polyarylene sulfides. One of the surprising effects found is that, for example, a cold-pressed molding of a polyarylene sulfone with, for example, polyphenylene sulfide as additive component does not melt even at temperatures of above 360° C., although polyphenylene sulfide has a melting temperature of from 280° to 290° C. Furthermore, it has been established that after the processing of the polymer mixtures, only the glass transition temperature of the polyarylene sulfone is detected in thermoanalyses. This indicates that the originally heterogeneous polymer mixture has been converted into a physicochemically homogeneous polymer mass by the processing procedure.

Polyarylene sulfones (A) which can be used for the mixtures of the invention are linear and/or branched polyarylenes ($M_w$: 4000–200,000) having recurring units of the formula (I):

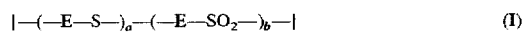

where E are, independently of one another, simple or directly para-, meta- or ortho-linked arylene systems having from 6 to 18 carbon atoms, preferably phenylene, naphthylene or biphenylene, where the sum of a+b is equal to 1, with the proviso that b is always $\geq 0.65$.

Particularly suitable are linear and branched polyphenylenes ($M_w$: 4000–200,000) having recurring units of the formula (II):

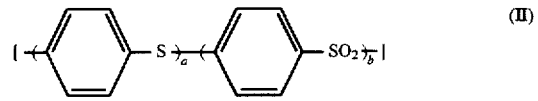

where a and b have the values defined above.

The polyarylene sulfones (A) can be prepared by the process described in the above-cited, as yet unpublished German Patent Application P 43 14 738.0, "Process for the oxidation of polyarylene compounds containing thioether groups" dated May 4, 1993, which is hereby expressly incorporated by reference.

Polyarylene sulfoxide (B) which can be used for the mixtures of the invention are linear and/or branched polyarylenes ($M_w$: 4000–200,000) having recurring units of the formula (III):

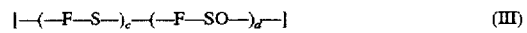

where F are, independently of one another, simple or directly para, meta- or ortho-linked arylene systems having from 6 to 18 carbon atoms, preferably phenylene, naphthylene or biphenylene, where the sum of c+d is equal to 1, with the proviso that d is always $\geq 0.70$.

Particularly suitable are linear and branched polyphenylenes ($M_w$: 4000–200,000) having recurring units of the formula (IV):

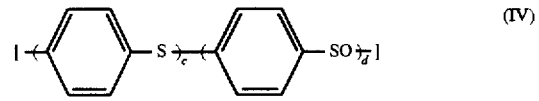

where c and d are as defined above.

The polyarylene sulfoxides (B) can be prepared by the process described in the as yet unpublished German Patent Application P 43 14 737.2, "Two-stage oxidation of polyarylene sulfides" of May 4, 1993, which is hereby expressly incorporated by reference.

Polyarylene sulfides (C) which can be used for the mixtures of the invention are linear and/or branched polyarylenes ($M_w$: 4000–200,000) having recurring units of the formula (V):

where G is a simple or directly para-, meta- or ortho-linked arylene system having from 6 to 18 carbon atoms, preferably phenylene, naphthylene or biphenylene.

Particularly suitable is linear and branched polyphenylene sulfide ($M_w$: 4000–200,000) having recurring units of the formula (VI):

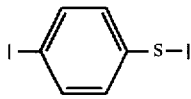
(VI)

which is commercially available.

The mixtures of the invention can contain customary additives, for example thermal stabilizers, UV stabilizers, antistatic agents, flame retardants, dyes, pigments, inorganic and/or organic fillers and also lubricant additives such as molybdenum sulfide or graphite.

The mean particle size ($d_{50}$) of the polymers (A) to (C) used is generally from $3\times10^{-6}$ to $500\times10^{-6}$ m, preferably from $5\times10^{-6}$ to $300\times10^{-6}$ m and in particular from $5\times10^{-6}$ to $200\times10^{-6}$ m.

The mixtures of the invention are generally prepared from the individual components in mixers suitable for this purpose. They can be converted by various known processes into shaped bodies which are homogeneous and, owing to their heat resistance, are suitable for fields of application in which high geometric stability on heating is required. For example, they are particularly suitable for use in engine construction and in electrical and electronic plants. For example, a known problem is the scorching at the current-conducting pole of electric plug-type connections, which frequently leads to destruction of the parts and can cause fires. Shaped bodies which are produced from the mixtures of the invention do not have these disadvantages.

The conditions during shaping are at the same level in the various processes suitable for this purpose. In all cases, the mixtures to be processed are exposed to temperatures which lie above the glass transition temperature of the respective polyarylene sulfone used. Usual temperatures here are from 280° to 450° C., preferably from 290° to 450° C. and in particular from 300° to 425° C. The specific pressing pressures required for shaping are generally $\geq 10$ bar, preferably $\geq 50$ bar and in particular $\geq 100$ bar.

Suitable shaping processes are hot pressing, transfer molding, cold pressing and sintering.

In the hot-pressing process, the mixture is pressed in the hot state, while in the cold-pressing process the specific pressure is applied to the mixture in a cold mold which is subsequently brought to the temperature required in a suitable manner.

In the transfer molding process, the mixture is heated in the appropriate pressing mold to the temperature required and is subsequently pressed by means of a press which is at room temperature.

In the sintering process, a compact is first produced at room temperature and this is subsequently sintered.

EXAMPLES

The polyphenylene sulfone (A) used was the product prepared according to Example 2 in the abovementioned German Patent Application P 43 14 738.0.

The polyphenylene sulfoxide (B) used was the product prepared according to Example 1 in the abovementioned German Patent Application P 43 14 737.2.

The polyphenylene sulfide (C) used had a density of 1.35 g/cm$^3$.

The polymers (A), (B) and (C) each had a mean particle size ($d_{50}$) of about $20\times10^{-6}$ m and were mixed in a Diosna mixer (manufactured by: Dierks & Söhne, Osnabrück, Federal Republic of Germany).

TABLE 1

|   | Polyphenylene sulfone (A) [% by weight] | Polyphenylene sulfoxide (B) [% by weight] | Polyphenylene sulfide (C) [% by weight] |
|---|---|---|---|
| Example 1 | 75 | 25 | — |
| Example 2 | 80 | 10 | 10 |
| Example 3 | 90 | — | 10 |
| Example 4 | 95 | — | 5 |
| Example 5 (Comp. Ex. 1) | 100 | — | — |
| Example 6 (Comp. Ex. 2) | — | 100 | — |

The mixtures of the Examples 1 to 4 and the polymers of the Examples 5 and 6 were processed by various methods as below.

Transfer Molding

The polymer powders or polymer mixtures were heated for 2 hours in a cylindrical mold having an internal diameter of 16 mm, which was closed by two solid cylinders, in an oven model K 750/1 from Heraeus (Hanau, Federal Republic of Germany). The amount weighed into the mold was about 8.25 g. After the heating-up time, the filled mold was immediately pressed hot under a 10 t press (own construction, hydraulic cylinder from FAG Kugelfischer, Erlangen, Federal Republic of Germany). Specific pressing pressure 1500 bar, pressing time 30 min, pressure relaxation time (decompression) 30 min. The shaped body was subsequently removed from the mold and checked for visible cracks. All products obtained were plasticized, had no visible cracks and could be subjected to various mechanical processes (e.g. sawing, drilling, milling, turning) with satisfactory results.

TABLE 2

| Shaped body by transfer molding | Oven temperature [°C.] | Density of the shaped body g/cm$^3$ | Properties after machining |
|---|---|---|---|
| Example 1 | 360 | 1.43 | no crack formation |
| Example 2 | 360 | 1.44 | |
| Example 3 | 360 | 1.44 | |
| Example 4 | 360 | 1.45 | |
| Example 5 (Comp. Ex. 1) | 400 | 1.43 | Occurence of cracks, disintegration of the shaped body |
| Example 6 (Comp. Ex. 2) | 260 | 1.43 | no crack formation |

Sintering

Shaped bodies (cold compacts) were obtained by pressing the polymers (A) and (B) [Comparative Examples 1 and 2] and also the mixtures 1 to 4 [Examples 1 to 4] as shown in Table 1 by pressing in the cylindrical mold as for transfer molding, but without the heating process. These were subsequently sintered in the oven K 750/1 from Heraeus in an air atmosphere under the following conditions:

a) heating at a constant heating rate from room temperature to sintering temperature (see Table 3), duration of the heating process: 8 hours;

b) 4 hours held at the sintering temperature;

c) cooling at a constant rate from sintering temperature to room temperature. Duration of the cooling process: 8 hours.

TABLE 3

| Shaped body, sintered | Sintering temperature [°C.] | Density of the shaped body obtained g/cm³ |
| --- | --- | --- |
| Example 1 | 360 | 1.08 |
| Example 2 | 360 | 1.09 |
| Example 3 | 360 | 1.11 |
| Example 4 | 360 | 1.12 |
| Example 5 (Comp. Ex. 1) | 360 | 1.10 |
| Example 6 (Comp. Ex. 2) | 260 | 1.10 |

All products obtained were plasticized and had no visible cracks. Subsequent machining of the test specimens (e.g. sawing, drilling, milling, turning) proceeded satisfactorily.

Thermoanalytical Measurements

DSC analyses were carried out on the starting materials or mixtures, the cold compacts, the sintered shaped parts and the shaped bodies produced by transfer molding:

DSC instrument: DSC-2C; manufactured by: Perkin Elmer, Überlingen, Federal Republic of Germany Measurement-conditions: Measurement atmosphere: nitrogen heating rate/cooling rate: 20° C./min temperature program (examples 1–4, comparative example 1): 1st heating from 50° C. to 380° C., cooling from 380° C. to 50° C., 2nd heating from 50° C. to 380° C. temperature program (comparative example 2): 1st heating from 50° C. to 300° C., cooling from 300° C. to 50° C., 2nd heating from 50° C. to 300° C.

$T_g$ is the glass transition temperature.

Composition in accordance with Example 1:

In the 1st heating, the powder mixture and the cold compact showed a $T_g$ at about 240° C. (polyphenylene sulfoxide) and also the commencement of an exothermic reaction above about 300° C. (onset DSC, polyphenylene sulfoxide decomposition). In the 2nd heating, only a $T_g$ at about 350° C. (polyphenylene sulfone) was able to be detected.

The sintered shaped part and the transfer molding showed only a $T_g$ at about 350° C. (polyphenylene sulfone) both in the 1st and 2nd heating. No thermal effects were able to be observed during the cooling processes.

Composition in accordance with Example 2:

In the 1st heating, the powder mixture and the cold compact each showed a $T_g$ at about 100° C. (polyphenylene sulfide) and about 240° C. (polyphenylene sulfoxide) and a melting peak at about 290° C. (polyphenylene sulfide), and also the commencement of an exothermic reaction above 300° C. (onset DSC, polyphenylene sulfoxide decomposition). In the 2nd heating, only a $T_g$ at 350° C. (polyphenylene sulfone) was able to be detected.

The sintered shaped part and the transfer molding showed only a $T_g$ at about 350° C. (polyphenylene sulfone) during both the 1st and 2nd heating. No thermal effects were able to be observed during the cooling processes.

Composition in accordance with Example 3:

In the 1st and 2nd heating, the powder mixture and the cold compact showed a melting peak at about 290° C., and also a $T_g$ at about 100° C. (polyphenylene sulfide) and about 350° C. (polyphenylene sulfone). During the cooling process, a recrystallization peak at about 180° C. (polyphenylene sulfide) was able to be observed.

The sintered shaped part and the transfer molding showed only a $T_g$ at about 350° C. (polyphenylene sulfone) in both the 1st and 2nd heating. No thermal effects were able to be observed in the two cooling processes.

Composition in accordance with Example 4:

This polymer mixture showed the same behavior as the mixture of Example 3.

Composition in accordance with Comparative Example 1:

For the powder mixture, the cold compact, the sintered shaped part and transfer molding, a $T_g$ at about 350° C. (polyphenylene sulfone) was able to be detected in the first and second heating.

No thermal effects were able to be observed in the cooling processes.

Composition in accordance with Comparative Example 2:

For the powder mixture, the cold compact, the sintered shaped part and the transfer molding, a $T_g$ at 240° C. (polyphenylene sulfoxide) was able to be detected in the first and second heating.

No thermal effects were able to be observed in the cooling processes.

Comparative Example 3

®Fortron X 0205/20 μm, a polyphenylene sulfide from Hoechst AG, Frankfurt/Main, Federal Republic of Germany, was used as comparison material. The polymer powder was examined in the unprocessed state.

In the first and second heating, the powder examined showed a $T_g$ at about 100° C. and also a melting peak at about 290° C. During the cooling process, a recrystallization peak was able to be observed at about 180° C.

We claim:

1. A polymer mixture comprising a component (A), a component (B) and a component (C); or component (A) and component (B); or component (A) and component (C), where component (A) is 33 to 99% by weight of at least one partially crystalline polyarylene sulfone which cannot be processed thermoplastically, component (B) is from 1 to 67% by weight of at least one polyarylene sulfoxide, and component (C) is from 1 to 40% by weight of a polyarylene sulfide having recurring units of the formula (VI)

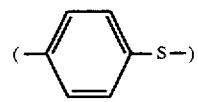

(VI)

and where the sum of the components (A), (B) and (C) in the mixture is 100%.

2. A mixture as claimed in claim 1, wherein components (B) and (C) are present and the proportion of component (B) is from 5 to 50% by weight and the proportion of component (C) is from 1 to 40% by weight.

3. A mixture as claimed in claim 1, wherein the component (A) used consists of linear and/or branched polyarylenes which are composed of recurring units of the formula (I)

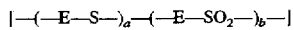

(I), where E are, independently of one another, simple or directly para-, meta- or ortho-linked arylene systems having from 6 to 18 carbon atoms, where the sum a+b is equal to 1, with the proviso that b is always ≧0.65.

4. A mixture as claimed in claim 3, wherein the component (A) used consists of polyarylenes having recurring units of the formula (II)

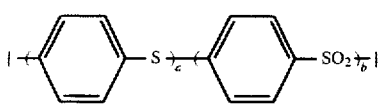
(II)

5. A mixture as claimed in claim 1, wherein the component (B) used consists of linear and/or branched polyarylenes which are composed of recurring units of the formula (III)

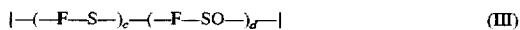
(III)

where F are, independently of one another, simple or directly para-, meta- or ortho-linked arylene systems having from 6 to 18 carbon atoms, where the sum of c+d is equal to 1, with the proviso that d is always $\geq 0.70$.

6. A mixture as claimed in claim 5, wherein the component (B) consists of polyarylenes having recurring units of the formula (IV)

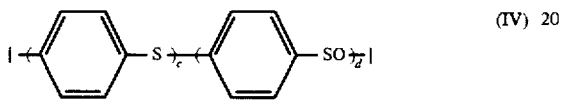
(IV)

7. A mixture as claimed in claim 1, which additionally contains thermal stabilizers, UV stabilizers, antistatic agents, flame retardants, dyes, pigments, inorganic and/or organic fillers.

8. A mixture as claimed in claim 1, wherein the mean particle size of the individual constituents (A), (B) and (C) is in the range from $3 \times 10^{-6}$ to $500 \times 10^{-6}$ m.

9. A method of producing shaped bodies comprising the steps of supplying a polymer mixture as claimed in claim 1, and hot pressing, transfer molding, cold pressing or sintering the shaped body.

10. A method as claimed in claim 9, wherein the shaped bodies are produced at temperatures of from 280° to 450° C. with the specific pressing pressures being $\geq 10$ bar.

11. A polymer mixture comprising a component (A) and a component (B), where component (A) is 33 to 99% by weight of at least one polyarylene sulfone, and component (B) is from 1 to 67% by weight of at least one polyarylene sulfoxide, where the sum of the components (A) and (B) in the mixture is 100%.

12. A polymer mixture comprising a component (A) and a component (C), where component (A) is 33 to 99% by weight of at least one partially crystalline polyarylene sulfone which cannot be processed thermoplastically, consisting of linear and/or branched polyarylenes, which are composed of recurring units of the formula (I)

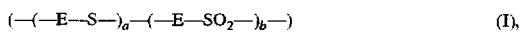
(I), where E are, independently of one another, simple or directly para-, meta- or ortho-linked arylene systems having from 6 to 18 carbon atoms, where the sum a+b is equal to 1, with the proviso that b is always >0.65, and component (C) is from 1 to 40% by weight of a polyarylene sulfide having recurring units of the formula (VI)

(VI)

and the sum of the components (A) and (C) in the mixture is 100%.

13. The mixture as claimed in claim 12 wherein the component (A) used consists of polyarylenes having recurring units of the formula (II)

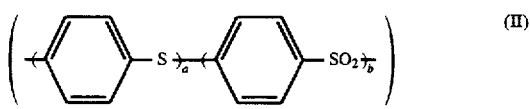
(II)

where the sum a+b is equal to 1, with the proviso that b is always $\geq 0.65$.

* * * * *